US012603305B2

(12) United States Patent
Saraidaridis et al.

(10) Patent No.: US 12,603,305 B2
(45) Date of Patent: Apr. 14, 2026

(54) REDOX FLOW BATTERY WITH IMPROVED EFFICIENCY

(71) Applicant: Raytheon Technologies Corporation, Waltham, MA (US)

(72) Inventors: James D. Saraidaridis, Hartford, CT (US); Zhiwei Yang, South Windsor, CT (US)

(73) Assignee: RTX CORPORATION, Arlington, VA (US)

( * ) Notice: Subject to any disclaimer, the term of this patent is extended or adjusted under 35 U.S.C. 154(b) by 1135 days.

(21) Appl. No.: 17/119,408

(22) Filed: Dec. 11, 2020

(65) Prior Publication Data

US 2022/0190364 A1 Jun. 16, 2022

(51) Int. Cl.
*H01M 8/04186* (2016.01)
*H01M 8/04082* (2016.01)
*H01M 8/18* (2006.01)

(52) U.S. Cl.
CPC ... *H01M 8/04186* (2013.01); *H01M 8/04201* (2013.01); *H01M 8/188* (2013.01)

(58) Field of Classification Search
CPC ......... H01M 8/04186; H01M 8/04201; H01M 8/043; H01M 8/04664; H01M 8/04776; H01M 8/188
See application file for complete search history.

(56) References Cited

U.S. PATENT DOCUMENTS

2016/0301094 A1* 10/2016 Longman ............ H01M 8/0438
2018/0269513 A1* 9/2018 Kaku ...................... H01M 8/18
2018/0316032 A1* 11/2018 Song ................. H01M 8/04753
(Continued)

FOREIGN PATENT DOCUMENTS

JP      H10-308-232      11/1998
JP      3425060          7/2003
(Continued)

OTHER PUBLICATIONS

Machine translation of JPH10308232A (publication of JP 3425060) Tokuda, Japan (Year: 1998).*
(Continued)

*Primary Examiner* — Brian R Ohara
*Assistant Examiner* — Brent C Thomas
(74) *Attorney, Agent, or Firm* — Carlson, Gaskey & Olds, P.C.

(57) ABSTRACT

A method for maintaining a redox flow includes draining a first battery electrolyte solution from a redox flow battery cell, the cell including a separator layer arranged between a first electrode and a second electrode, a first circulation loop configured to provide the first battery electrolyte solution to the first electrode and a second circulation loop configured to provide a second battery electrolyte solution to the second electrode; and flowing a non-battery electrolyte solution through the first electrode. The non-battery electrolyte removes at least a portion of the solid precipitates from at least one of the first electrode and the separator layer. The method also includes draining the non-battery electrolyte solution from the cell and returning the first battery electrolyte solution to the cell. A method for a redox flow battery and a redox flow battery are also disclosed.

15 Claims, 2 Drawing Sheets

(56)          References Cited

U.S. PATENT DOCUMENTS

2019/0341641 A1 * 11/2019 Tomita .............. H01M 10/0587
2020/0373597 A1 * 11/2020 Perry ................... H01M 8/188

FOREIGN PATENT DOCUMENTS

| JP | 3425060 B2 * | 7/2003 |
| JP | 2007188729 | 7/2007 |
| WO | 2021091666 | 5/2021 |

OTHER PUBLICATIONS

Piranha Solutions, Div. of Rsch. Safety, Univ. of Ill. Urbana-Champaign (Dec. 4, 2023), available at https://www.drs.illinois.edu/Page/SafetyLibrary/PiranhaSolutions.*
International Search Report and Written Opinion for International Patent Application No. PCT/US2021/062839 dated Apr. 5, 2022.
International Preliminary Report on Patentability for International Patent Application No. PCT/US2021/062839 dated Jun. 22, 2023.
Korean Notice of Preliminary Rejection for Korean Application No. 10-2023-7023572 mailed Sep. 18, 2025.

* cited by examiner

REDOX FLOW BATTERY WITH IMPROVED EFFICIENCY

STATEMENT REGARDING FEDERALLY SPONSORED RESEARCH OR DEVELOPMENT

This invention was made with government support under Contract No. DE-AR000994, awarded by the Department of Energy. The Government has certain rights in this invention.

BACKGROUND

Flow batteries, also known as redox flow batteries or redox flow cells, are designed to convert electrical energy into chemical energy that can be stored and later released back into electrical energy when there is demand. As an example, a flow battery may be used with a renewable energy system, such as a wind-powered system, to store energy that exceeds consumer demand and later release that energy when there is greater demand.

A typical flow battery includes a redox flow cell that has a negative electrode and a positive electrode separated by an electrolyte layer, which may include a separator, such as an ion-exchange membrane. A negative fluid electrolyte (some-times referred to as the anolyte or negolyte) is delivered to the negative electrode and a positive fluid electrolyte (some-times referred to as the catholyte or posolyte) is delivered to the positive electrode to drive reversible redox reactions between redox pairs. Upon charging, the electrical energy supplied causes a reduction reaction in one electrolyte and an oxidation reaction in the other electrolyte. The separator prevents the electrolytes from freely and rapidly mixing but selectively permits ions to pass through to complete the redox reactions. Upon discharge, the chemical energy con-tained in the liquid electrolytes is released in the reverse reactions and electrical energy is drawn from the electrodes.

SUMMARY

A method for maintaining a redox flow battery according to an exemplary embodiment of this disclosure, among other possible things includes draining a first battery electrolyte solution from a redox flow battery cell, the cell including a separator layer arranged between a first electrode and a second electrode, a first circulation loop configured to pro-vide the first battery electrolyte solution to the first electrode and a second circulation loop configured to provide a second battery electrolyte solution to the second electrode; and flowing a non-battery electrolyte solution through the first electrode. The non-battery electrolyte removes at least a portion of the solid precipitates from at least one of the first electrode and the separator layer. The method also includes draining the non-battery electrolyte solution from the cell and returning the first battery electrolyte solution to the cell.

In a further example of the foregoing, the non-battery electrolyte solution removes the solid precipitates from the cell by carrying the solid electrolytes out of the cell.

In a further example of any of the foregoing, the non-battery electrolyte solution is chemically inert with respect to the solid precipitates.

In a further example of any of the foregoing, the non-battery electrolyte solution removes solid precipitates from the cell by dissolving the solid precipitates.

In a further example of any of the foregoing, the non-battery electrolyte solution includes at least one species that is active with respect to the solid precipitates. The activity between the solid precipitates and the at least one species removes the solid precipitates from the cell.

In a further example of any of the foregoing, the solid precipitates include at least one metal. The at least one active species includes chelating agent, the chelating agent facili-tating the removal of the metal solid precipitates from the cell.

In a further example of any of the foregoing, the at least one active species includes a species that is chemically reactive with respect to the solid precipitates such that the reaction product of the component and the solid precipitates is soluble in the non-battery electrolyte solution.

In a further example of any of the foregoing, the reaction product is one of the product of a reduction reaction and the product of an oxidation reaction.

In a further example of any of the foregoing, the at least one active species includes a species that is chemically reactive with respect to the solid precipitates such that the reaction product is a gas.

In a further example of any of the foregoing, the method also includes venting the gas.

In a further example of any of the foregoing, the non-battery electrolyte solution has a common solvent with at least one of the first and second battery electrolytes.

In a further example of any of the foregoing, wherein the non-battery electrolyte solution does not include any active species from either of the first and second battery electrolyte solutions.

In a further example of any of the foregoing, the method includes determining an amount of solid precipitates in the cell prior to the draining step, and comparing the amount of solid precipitates to a predetermined threshold amount of solid precipitates.

In a further example of any of the foregoing, the method includes flowing the non-battery electrolyte solution through the second electrode. The non-battery electrolyte removes the solid precipitates from the second electrode.

A method for a redox flow battery according to an exemplary embodiment of this disclosure, among other possible things includes using a cell of a redox flow battery to store input electrical energy upon charging and releasing the stored electrical energy upon discharging. The cell has a separator layer arranged between a first electrode and a second electrode. The using includes circulating a first electrolyte solution through a first circulation loop in fluid connection with the first electrode of the cell and circulating a second electrolyte solution through a second circulation loop in fluid connection with the second electrode of the cell. At least one reaction product precipitates as a solid precipi-tate in the second electrode. The method also includes removing at least a portion of the solid product from at least one of the second electrode and the separator layer by flowing a non-battery electrolyte through the second elec-trode. The non-battery electrolyte removes the solid precipi-tate from the cell.

In a further example of the foregoing, the non-battery electrolyte solution removes the solid precipitates from the cell by carrying the solid electrolytes out of the cell.

In a further example of any of the foregoing, the non-battery electrolyte solution includes at least one species that is active with respect to the solid precipitates. The activity between the solid precipitates and the at least one species removes the solid precipitates from the cell.

In a further example of any of the foregoing, the at least one active species includes a species that is chemically reactive with respect to the solid precipitates such that the reaction product of the component and the solid precipitates is soluble in the non-battery electrolyte solution.

In a further example of any of the foregoing, the solid product is one of the product of a reaction between an element of the first electrolyte and an element of the second electrolyte and the product of a side reaction between two elements of the second electrolyte.

A redox flow battery according to an exemplary embodiment of this disclosure, among other possible things includes a cell having a first electrode and a second electrode and a separator layer arranged between the first and second electrodes; a first circulation loop fluidly connected with the first electrode; a first battery electrolyte solution contained in the first recirculation loop; a second circulation loop fluidly connected with the second electrode; a second battery electrolyte solution contained in the second recirculation loop; a third circulation loop fluidly connected to the first electrode, second electrode or both; and a non-battery electrolyte solution contained in the third recirculation loop. The non-battery electrolyte solution includes at least one species that is chemically reactive with solid precipitates such that the non-battery electrolyte solution is operable to remove at least a portion of the solid precipitates from at least one of the first electrode, the second electrode, and the separator layer.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
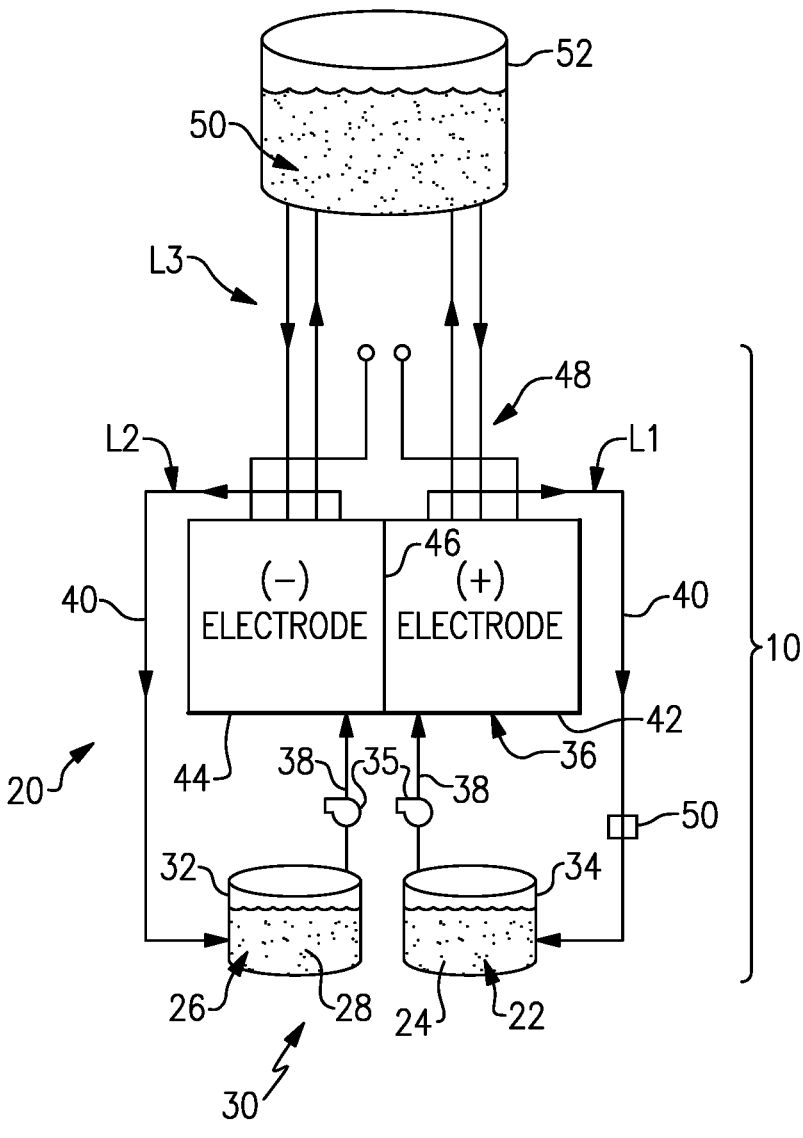
FIG. 1 illustrates an example redox flow battery.

FIG. 1 schematically shows portions of an example system 10 that includes a redox flow battery 20 ("RFB 20") for selectively storing and discharging electrical energy. As an example, the RFB 20 can be used to convert electrical energy generated in a renewable energy system to chemical energy that is stored until a later time when there is greater demand, at which time the RFB 20 can be used to convert the chemical energy back into electrical energy. The RFB 20 can supply the electric energy to an electric grid, for example.

The RFB 20 includes a first electrolyte 22 that has at least one electrochemically active species 24 that functions in a redox pair with regard to a second electrolyte 26 that has at least one electrochemically active species 28. As will be appreciated, the terminology "first" and "second" is to differentiate that there are two distinct electrolytes/electrodes. It is to be further understood that terms "first" and "second" are interchangeable in that the first electrolyte/electrode could alternatively be termed as the second electrolyte/electrode, and vice versa.

At least the first electrolyte is a liquid, but the second electrolyte is typically also a liquid. For example, the electrochemically active species 24, 28 can be based on vanadium or iron. The electrochemically active species 24, 28 can include ions of elements that have multiple, reversible oxidation states in a selected liquid solution, such as but not limited to, aqueous solutions, dilute aqueous acids or dilute aqueous bases, such as 1-5M sulfuric acid or 1-5M sodium hydroxide, or near neutral solutions that have <1M acid or base concentrations. In some examples, the multiple oxidation states are non-zero oxidation states, such as for transition metals including but not limited to vanadium, iron, manganese, chromium, zinc, molybdenum and combinations thereof, and other elements including but not limited to sulfur, cerium, lead, tin, titanium, germanium and combinations thereof. In some examples, the multiple oxidation states can include the zero oxidation state if the element is readily soluble in the selected liquid solution in the zero oxidation state. Such elements can include the halogens, such as bromine, chlorine, and combinations thereof. The electrochemically active species 24, 28 could also be organic molecules or macromolecules that contain groups that undergo electrochemically reversible reactions, such as quinones, or nitrogen-containing organics such as quinoxalines or pyrazines, or sulfur-containing organics such as phenothiazine. In embodiments, the electrolytes 22 and 26 are solutions that include one or more of the electrochemically active species 24, 28. The first electrolyte 22 (e.g., the positive electrolyte) and the second electrolyte 26 (e.g., the negative electrolyte) are contained in a supply/storage system 30 that includes first and second vessels 32, 34.

The electrolytes 22, 26 are circulated by pumps 35 to at least one redox flow cell 36 of the flow battery 20 through respective feed lines 38, and are returned from the cell 36 to the vessels 32, 34 via return lines 40. As can be appreciated, additional pumps 35 can be used if needed, as well as valves (not shown) at the inlets/outlets of the components of the RFB 20 to control flow. In this example, the feed lines 38 and the return lines 40 connect the vessels 32, 34 in respective loops L1, L2 with first and second electrodes 42/44. Multiple cells 36 can be provided as a stack within the loops L1, L2.

The cell or cells 36 each include the first electrode 42, the second electrode 44 spaced apart from the first electrode 42, and an electrolyte separator layer 46 arranged between the first electrode 42 and the second electrode 44. For example, the electrodes 42/44 may be porous electrically-conductive structures, such as carbon paper or felt. The electrodes 42/44 may also contain additional materials which are catalytically-active, for example a metal oxide. In general, the cell or cells 36 can include bipolar plates, manifolds and the like for delivering the electrolytes 22/26 through flow field channels to the electrodes 42/44. It is to be understood, however, that other configurations can be used. For example, the cell or cells 36 can alternatively be configured for flow-through operation where the fluid electrolytes 22/26 are pumped directly into the electrodes 42/44 without the use of flow field channels.

The electrolyte separator layer 46 can be, but is not limited to, an ionic-exchange membrane, a micro-porous polymer membrane or an electrically insulating microporous matrix of a material, such as silicon carbide (SiC), that prevents the electrolytes 22/26 from freely and rapidly mixing but permits selected ions to pass through to complete the redox reactions while electrically isolating the electrodes 42/44. In this regard, the loops L1, L2 are isolated from each other during normal operation, such as charge, discharge and shutdown states.

The electrolytes 22/26 are delivered to, and circulate through, the cell or cells 36 during an active charge/discharge mode to either convert electrical energy into chemical energy or, in the reverse reaction, convert chemical energy into electrical energy that is discharged. The electrical energy is transmitted to and from the cell or cells 36 through an electric circuit 48 that is electrically coupled with the electrodes 42/44.

In one example based on aqueous vanadium electrolyte chemistry the electrolytes 22/26 include $V^{2+}/V^{3+}$ and $V^{4+}/V^{5+}$ (which can also be denoted as V(ii)/V(iii) and V(iv)/V(v), although the charge of the vanadium species with oxidation states of 4 and 5 are not necessarily +4 and +5), respectively, as the electrochemically active species 24/28. For example, if the electrolyte solution is aqueous sulfuric acid, then the V(iv)/V(v) species of the first electrolyte 22 will be present as $VO^{2+}$ and $VO_2^+$ and the V(ii)/V(iii) species of the second electrolyte will be present as and $V^{2+}$ and $V^{3+}$ ions. During operation of the RFB 20, there is some crossover of vanadium species from the first electrode 42 across the separator layer 46 and into the second electrode 44, and vice versa. Generally, the vanadium species employed are soluble in both environments. However, at relatively high operating temperatures, e.g., those higher than about 40 degrees C., $V^{5+}$ has decreased solubility in the environment of the first electrode 42 and therefore can precipitate from the solution.

The vanadium system discussed above uses similar active species 24/28 (e.g., various charge states of vanadium) for both electrolyte loops L1/L2. However, other example systems may use two different active species 24/28. One particular example is an iron/chromium system and another particular example is a sulfur/manganese system, both of which are known in the art. Some systems with different active species, including the foregoing examples, are attractive for use in RBFs due to their low chemical cost as compared to vanadium systems, for example. However, crossover of the active species 24/28 across the separator layer 46 may lead to the formation of solid precipitates due to the incompatibility of the first active species 24 with the solution in the second electrode 44 or the second active species 28 with the solution in the first electrode 42. Additionally, in some examples side reactions between species in the electrolytes 22/26 could form solid precipitates that collect in the electrodes 42/44 or on the separator layer 46.

In both types of systems, e.g., those with similar and dissimilar active species, the precipitation of certain solids can not only decrease the amount of active species 24/28 within the RFB 20, which can diminish the capacity of the RFB 20, but also can lead to efficiency losses due to the presence of solid precipitates in the RFB 20. For example, the solids can precipitate onto electrodes 42/44, and block electrolytes 22/26 from reaching active sites on the electrodes 44/42. As another examples, the solids can precipitate onto, or otherwise become clogged in, the separator layer 26, and thereby inhibit ion exchange across the separator layer 26. The method discussed below allows for removal of these solid precipitates from the RFB 20, and in some examples also allows for recovery of the active species 24/28 from the precipitates.

As shown in FIG. 1, the RFB 20 further includes a third circulation loop L3 fluidly connected with the cell 36 and an electrolyte storage tank 50. The third circulation loop L3 contains a non-battery electrolyte solution 52 (i.e., fluidly connected to the tank 50) that does not contain either of the active species 24/28. In some examples, the non-battery electrolyte solution 52 may include the same solvent as one or both of the electrolytes 22/26.

Figure 2:
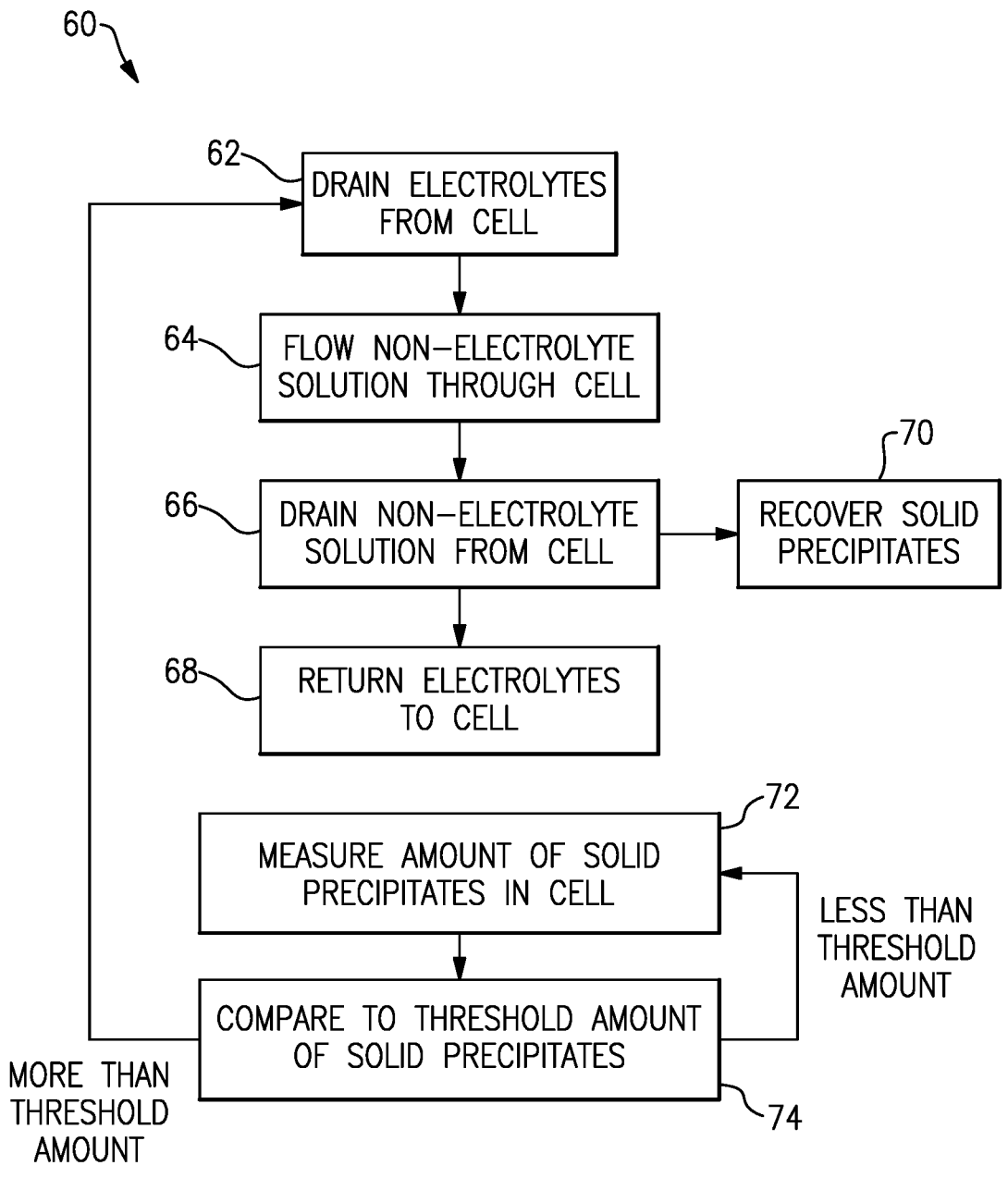
FIG. 2 illustrates an example method for recovering solid precipitates from the example redox flow battery of claim 1.

A method 60 for maintaining an RFB 20 by removing precipitates from the RFB 20 is schematically shown in FIG. 2. In step 62, the electrolytes 22/26 are drained from the RFB 20 into the storage tanks 32/24 according to any known method. In step 64, the non-battery electrolyte 50 is flowed through the cell 36 from the third circulation loop L3. The non-battery electrolyte 50 can be flowed through one or both of the electrodes 42/44. For instance, in some examples, the solid precipitates collect in an appreciable amount in one of the electrodes 42/44. In this example, the non-battery electrolyte 52 would be flowed through the electrode 42/44 with the solid precipitates.

As the non-battery electrolyte flows through the cell 36, it removes solid precipitates from the cell 36 and carries them or their constituent elements out of the electrodes 42/44. In step 66, the non-battery electrolyte solution 52 is drained back to the storage tank 50. In step 68, the first and second electrolytes 22/26 are returned to the cell 36 for normal RFB operation as discussed above.

In some examples, the solid precipitates can be recovered from the non-battery electrolyte solution 52 and provided back to the appropriate electrolyte solution 22/26 in the cell 36 in optional step 70.

In some examples, the method 60 includes optional monitoring/feedback steps. In optional step 72, the amount of solid precipitates in the cell 36 is determined. The amount of solid precipitates in the cell 36 can be determined by correlation with flow, pressure, or efficiency measurements that can be collected from the RFB 20. In optional step 74, the amount of solid precipitates from step 72 is compared to a predetermined threshold amount of solid precipitates. If the amount from step 72 exceeds the threshold amount from step 74, the method 60 begins at step 62. If the amount from step 72 is below the threshold amount from step 74, the method returns to step 72. In some examples, steps 72 and 74 can be performed automatically at predetermined time intervals.

The precipitate removal in step 64 can be accomplished in various ways. In one example, the removal occurs by a mechanical removal process, e.g., the flow of non-electrolyte solution 52 physically sweeps up the solid precipitates within the cell 36 and carries them out of the cell 36. In this example, the non-electrolyte solution 52 could be chemically inert with respect to the solid precipitates.

In another example, the non-electrolyte solution 52 contains one or more species that are active with respect to the solid precipitates, and the activity causes removal of the solid precipitates from the cell 36 during the removal step 64. For instance, the non-electrolyte solution 52 could include chelating agents which interact with metallic solid precipitates, thereby changing the solubility of the metallic precipitates and carrying them out of the cell 36 in solution phase. As another example, the non-electrolyte solution 52 could include a solvent with a high solubility for the solid precipitates, thereby dissolving the solid precipitates and removing them from the cell 36. In yet another example, the non-electrolyte solution 52 could include one or more species that can oxidize, reduce, or otherwise react with the solid precipitate to form a reaction product that is more easily removed from the cell 36. The reaction product could be an ion or other species that is soluble in the non-electrolyte solution 52 and is thereby removed by the non-electrolyte solution 52. In another example, the reaction product could be a gas that can be exhausted from the RFB 20 system.

In the foregoing example where the non-electrolyte solution 52 includes one or more species that is active with respect to the solid precipitates, the activity between the active species and the solid precipitate occurs spontaneously. For instance, if the species is active with respect to the solid precipitate in that it reduces or oxidizes the solid precipitate, the chemical reaction between the two favor the formation of the reaction product.

One example system that employs the method 60 is a sulfur/manganese RFB 20. The following equations demonstrate example reactions in the cell 36, as well as the resulting standard electrode potential)($E^0$) versus Standard Hydrogen Electrode (SHE) and Open Cell Voltage (OCV) is defined herein as the difference between the standard electrode potentials of the two electrode reactions:

Anode: $2S^{2-}=S_4^{2-}+2e^- E^0=-0.49$ vs. SHE

Cathode: $MnO_4^-+e^-=MnO_4^{2-} E^0=0.56$ vs. SHE

Net Cell: $2MnO_4^-+2S^{2-}=MnO_4^{2-}+S_4^{2-} OCV=1.06V$

Disproportionation of $MnO_4^{2-}$ ($Mn^{6+}$) can lead to the formation of $MnO_2$ precipitates. An acidic hydrogen peroxide solution can be used as the non-electrolyte solution 52 to remove the solid $MnO_2$ precipitates by reacting with the $MnO_2$ precipitates according to the following equations:

Dissolution: $MnO_2+4H^++2e=Mn^{2+}+2H_2O E^0=1.23$ vs. SHE

Peroxide Decomposition: $H_2O_2=O_2+2H^++2e^-$ $E^0=0.695$ vs. SHE

Full Reaction: $MnO_2+2H^++H_2O_2=Mn^{2+}+2H_2O+O_2$

As shown, the decomposition of hydrogen peroxide provides the electrons and some of the protons needed to reduce $MnO_2$ to soluble $Mn^{2+}$, which dissolves into the non-electrolyte solution and is thereby removed from the cell 36.

In some examples, the method 60 can be used as a pre-treatment step in an electrolyte takeover method (ETM). In one example, an ETM includes flowing the first electrolyte 22 through the second electrode 44 and/or flowing the second electrolyte 26 through the first electrode 42 so that the electrolytes 22/26 collect species that have crossed over the separator layer 46 to the other of the electrodes 42/44. The foregoing method 60 can improve the efficacy of subsequent ETM steps by assisting in removing solid precipitates from the cell 36 as discussed above.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A method for maintaining a redox flow battery, comprising:

draining a first battery electrolyte solution from a redox flow battery cell, the cell including a separator layer arranged between a first electrode and a second electrode, a first circulation loop configured to provide a first battery electrolyte solution to the first electrode and a second circulation loop configured to provide a second battery electrolyte solution to the second electrode;

flowing a non-battery electrolyte solution through the first electrode, whereby the non-battery electrolyte solution removes at least a portion of solid precipitates from at least one of the first electrode and the separator layer, wherein the non-battery electrolyte solution includes at least one active species that is chemically reactive with respect to the solid precipitates such that the reaction production is a gas;

draining the non-battery electrolyte solution from the cell; and returning the first battery electrolyte solution to the cell.

2. The method of claim 1, wherein the non-battery electrolyte solution removes the solid precipitates from the cell by carrying the solid precipitates out of the cell.

3. The method of claim 1, wherein the non-battery electrolyte solution removes solid precipitates from the cell by dissolving the solid precipitates.

4. The method of claim 1, wherein the non-battery electrolyte solution includes at least one species that is active with respect to the solid precipitates, and wherein the activity between the solid precipitates and the at least one species removes the solid precipitates from the cell.

5. The method of claim 4, wherein the solid precipitates include at least one metal, and wherein the at least one active species includes chelating agent, the chelating agent facilitating the removal of the metal solid precipitates from the cell.

6. The method of claim 1, wherein the reaction product is one of the product of a reduction reaction and the product of an oxidation reaction.

7. The method of claim 1, further comprising venting the gas.

8. The method of claim 1, wherein the non-battery electrolyte solution has a common solvent with at least one of the first battery electrolyte solution.

9. The method of claim 1, wherein the non-battery electrolyte solution does not include any active species from the first battery electrolyte solution.

10. The method of claim 1, further comprising determining an amount of solid precipitates in the cell prior to the draining step, and comparing the amount of solid precipitates to a predetermined threshold amount of solid precipitates.

11. The method of claim 1, further comprising flowing the non-battery electrolyte solution through the second electrode, whereby the non-battery electrolyte removes the solid precipitates from the second electrode.

12. A method for a redox flow battery, the method comprising:

using a cell of a redox flow battery to store input electrical energy upon charging and releasing the stored electrical energy upon discharging, wherein the cell has a separator layer arranged between a first electrode and a second electrode, and wherein the using includes circulating a first electrolyte solution through a first circulation loop in fluid connection with the first electrode of the cell, circulating a second electrolyte solution through a second circulation loop in fluid connection with the second electrode of the cell, and wherein at least one reaction product precipitates as a solid precipitate in the second electrode; and removing at least a portion of the solid product from at least one of the second electrode and the separator layer by flowing a non-battery electrolyte solution through the second electrode, wherein the non-battery electrolyte solution includes at least one species that is that is chemically reactive with respect to the solid precipitate such that the reaction product is a gas, and wherein the gas is removed from the cell.

13. The method of claim 12, wherein the at least one active species includes a species that is chemically reactive with respect to the solid precipitates such that the reaction product of the component and the solid precipitates is soluble in the non-battery electrolyte solution.

14. The method of claim 12, wherein the solid product is one of the product of a reaction between an element of the first electrolyte and an element of the second electrolyte and the product of a side reaction between two elements of the second electrolyte.

15. A redox flow battery comprising:

a cell having a first electrode and a second electrode and a separator layer arranged between the first and second electrodes;

a first circulation loop fluidly connected with the first electrode;

a first battery electrolyte solution contained in the first circulation loop;

a second circulation loop fluidly connected with the second electrode;

a second battery electrolyte solution contained in the second circulation loop;

a third circulation loop fluidly connected to the first electrode, second electrode or both; and a non-battery electrolyte solution contained in the third circulation loop, the non-battery electrolyte solution including at least one species that is chemically reactive with solid precipitates such that the reaction product is a gas and such that the non-battery electrolyte solution is operable to remove at least a portion of the solid precipitates from at least one of the first electrode, the second electrode, and the separator layer.

* * * * *